United States Patent
Vecera et al.

(10) Patent No.: US 9,305,006 B2
(45) Date of Patent: Apr. 5, 2016

(54) MEDIA COMPRESSION IN A DIGITAL DEVICE

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 367 days.

(21) Appl. No.: 12/944,153

(22) Filed: Nov. 11, 2010

(65) Prior Publication Data

US 2012/0124109 A1    May 17, 2012

(51) Int. Cl.
G06F 7/00     (2006.01)
G06F 17/30    (2006.01)

(52) U.S. Cl.
CPC .... *G06F 17/30138* (2013.01); *G06F 17/30153* (2013.01)

(58) Field of Classification Search
USPC ............. 704/200.1; 348/207.1, 241; 708/400; 709/219; 705/37
See application file for complete search history.

(56) References Cited

U.S. PATENT DOCUMENTS

| | | | |
|---|---|---|---|
| 6,301,392 B1* | 10/2001 | Acharya | 382/239 |
| 6,583,887 B1* | 6/2003 | Clouthier et al. | 358/1.15 |
| 6,757,687 B2* | 6/2004 | Davidson et al. | 707/999.101 |
| 7,024,512 B1* | 4/2006 | Franaszek et al. | 711/100 |
| 7,047,382 B2* | 5/2006 | Geiger et al. | 711/165 |
| 7,092,010 B2* | 8/2006 | Iida | 348/207.1 |
| 7,546,354 B1* | 6/2009 | Fan et al. | 709/219 |
| 7,805,476 B2* | 9/2010 | Hou | 708/400 |
| 2004/0044521 A1* | 3/2004 | Chen et al. | 704/200.1 |
| 2007/0030766 A1* | 2/2007 | Tanaka | 369/30.05 |
| 2008/0129844 A1* | 6/2008 | Cusack et al. | 348/241 |

OTHER PUBLICATIONS

"One Laptop per Child", accessed at http://en.wikipedia.org/wiki/One_laptop_per_child on Nov. 10, 2010, last updated Nov. 3, 2010, 19 pages.

"Lossy compression", accessed at http://en.wikipedia.org/wiki/Lossy_data_compression on Nov. 10, 2010, last updated Nov. 7, 2010, 8 pages.

* cited by examiner

*Primary Examiner* — Uyen Le
(74) *Attorney, Agent, or Firm* — Lowenstein Sandler LLP

(57) ABSTRACT

Some embodiments of a method to automatically compress content in a digital device have been presented. In some embodiments, available data storage space in the digital device is monitored. When the available data storage space falls below a predetermined threshold, a user of the digital device is automatically asked whether the user allows compression of one or more types of content stored on the digital device in order to increase data storage space available.

24 Claims, 4 Drawing Sheets

MEDIA COMPRESSION IN A DIGITAL DEVICE

TECHNICAL FIELD

Embodiments of the present invention relate to digital devices, and more specifically to conserving storage space in a digital device.

BACKGROUND

Today, digital devices, such as digital cameras, portable media players, smart phones, etc., are widely used in people's everyday life. One convenient feature of digital devices is the capability to store various content, such as still image files, music files, video files, etc. However, as many such digital devices are handheld devices, these digital devices may have only a limited amount of data storage space. Sometimes, when data storage space is running out in a digital device, a user of the digital device may not have an opportunity to clear it (e.g., to transfer some of the content stored in the digital device to another device). As a result, the user may be forced to stop storing additional content onto the digital device until the user has a chance to clear at least some of the existing content stored on the digital device. This generally causes great inconvenience to the user.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to automatically compress media in a digital device. In general, a digital device as used herein refers to an electronic device having processing capability and data storage. The electronic device may be implemented with hardware, which can include special-purpose devices or circuitry, and/or general-purpose devices; software; firmware; or a combination of any of the above. The digital device can be a portable device or a handheld device. Some examples of a digital device include a digital camera, a personal digital assistant (PDA), a smart phone, a media player (e.g., a video player, a music player, etc.), a multifunctional device (e.g., a cellular telephone integrated with a digital camera), a laptop computer, a desktop computer, etc.

In some embodiments, available data storage space in the digital device is monitored. When the available data storage space falls below a predetermined threshold, a user of the digital device is automatically asked whether the user allows compression of one or more types of content stored on the digital device in order to increase data storage space available. More details of some embodiments of a method and an apparatus to automatically compress content in a digital device are described below.

Figure 1A:
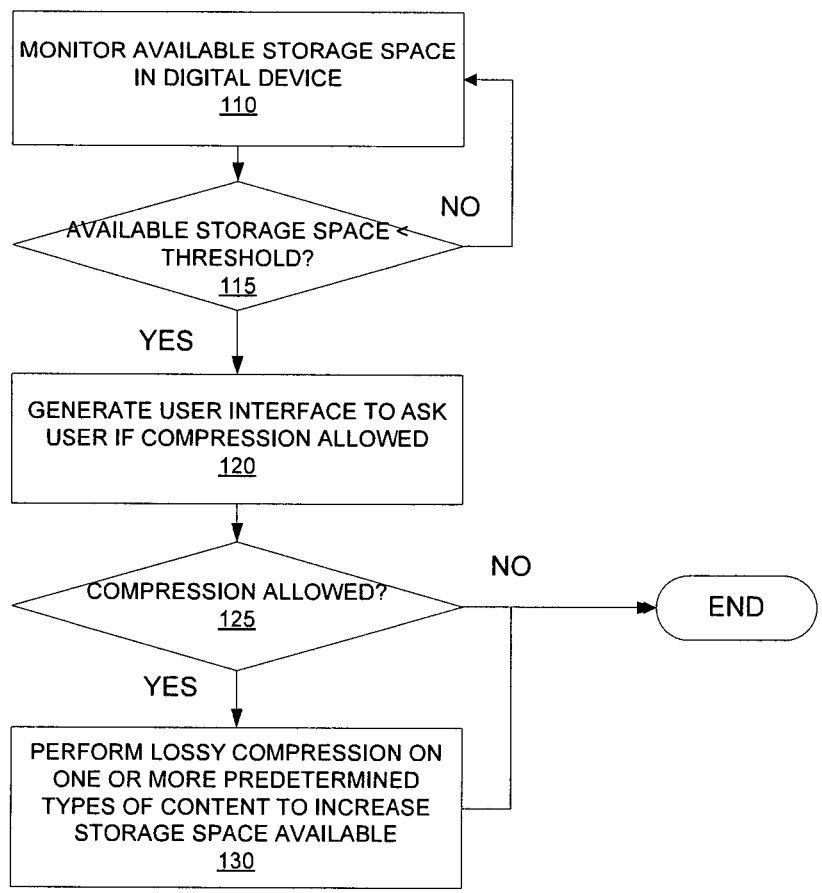
FIG. 1A illustrates one embodiment of a method to automatically compress media in a digital device.

FIG. 1A illustrates one embodiment of a method to automatically compress content in a digital device. At least part of the method can be performed by a processing device, such as the processing device 210 shown in FIG. 2. Initially, processing logic monitors available data storage space in the digital device (processing block 110). In some embodiments, processing logic monitors the data storage space available in a computer-readable storage device of the digital device, which may be removably coupled to the digital device (e.g., a flash memory card inserted into a digital camera), or non-removably coupled to the digital device (e.g., a hard drive installed in a tablet computer). Processing logic may check the available data storage space periodically (e.g., every minute), or each time data is stored, updated, or removed from the computer-readable storage device.

In some embodiments, processing logic checks if the available data storage space falls below a predetermined threshold (processing block 115). The predetermined threshold may have been determined and stored in the digital device by the manufacturer of the digital device. The user may be allowed to modify the threshold in some embodiments. For instance, the threshold may be stored in a configuration file of the digital device and the user may change the threshold in the configuration file. If the available data storage space is at or above the predetermined threshold, then processing logic returns to processing block 110 to continue monitoring the available data storage space in the digital device.

If the available data storage space is below the predetermined threshold, then processing logic generates a user interface to ask a user of the digital device if the user allows compression of content stored in the digital device (processing block 120). The user interface may include a graphical user interface (GUI) and/or a command line interface. An exemplary embodiment of a GUI is discussed in further details below with reference to FIGS. 3A-3B.

In some embodiments, processing logic allows the user to select which type(s) of content to compress. For example, processing logic may provide a set of different types of contents, such as audio files, video files, still image files, etc. The user may select one or more types of contents to be compressed.

In some alternate embodiments, processing logic may allow the user or the manufacturer of the digital device to configure the digital device to allow or disallow compression when the available data storage space falls below the predetermined level. For example, the manufacturer may have setup the digital device initially to allow compression by setting a particular flag in the configuration file of the digital device, which may be overridden by user action later. Furthermore, if the user selects to disallow compression of content stored in the digital device, the user may also configure the digital device not to prompt the user every time the data storage space falls below the predetermined threshold. For instance, processing logic may generate a dialog box or dialog window to allow the user to select the option of "Do not ask again when storage space becomes low."

Referring back to FIG. 1A, processing logic checks user input to determine if the user allows compression of content (processing block 125). If the user does not allow compression of content, then the process ends. Otherwise, if the user allows compression of content, then processing logic may perform lossy compression on one or more types of content in the digital device to increase storage space in the digital device (processing block 130) and then the process ends.

In general, lossy compression refers to a data encoding scheme that discards some of the data (in other words, loses some of the data) in order to reduce the overall size of the data.

As a result, when decompressed, the data may be different from the original, though the difference may be not significant enough to be noticed by users. Some examples of lossy compression data formats include JPEG (Joint Photographic Experts Group) format for still images, MPEG-2 (Moving Picture Experts Group-2) for video files, MP3 (MPEG-2 Audio Layer III) for music files, etc. The advantage of lossy compression is the significant saving in storage space, even though the quality of the content may be compromised because of the data lost. For still image files, processing logic may reduce resolution of the image to further reduce the size of the still image files, subject to user approval.

Figure 1B:
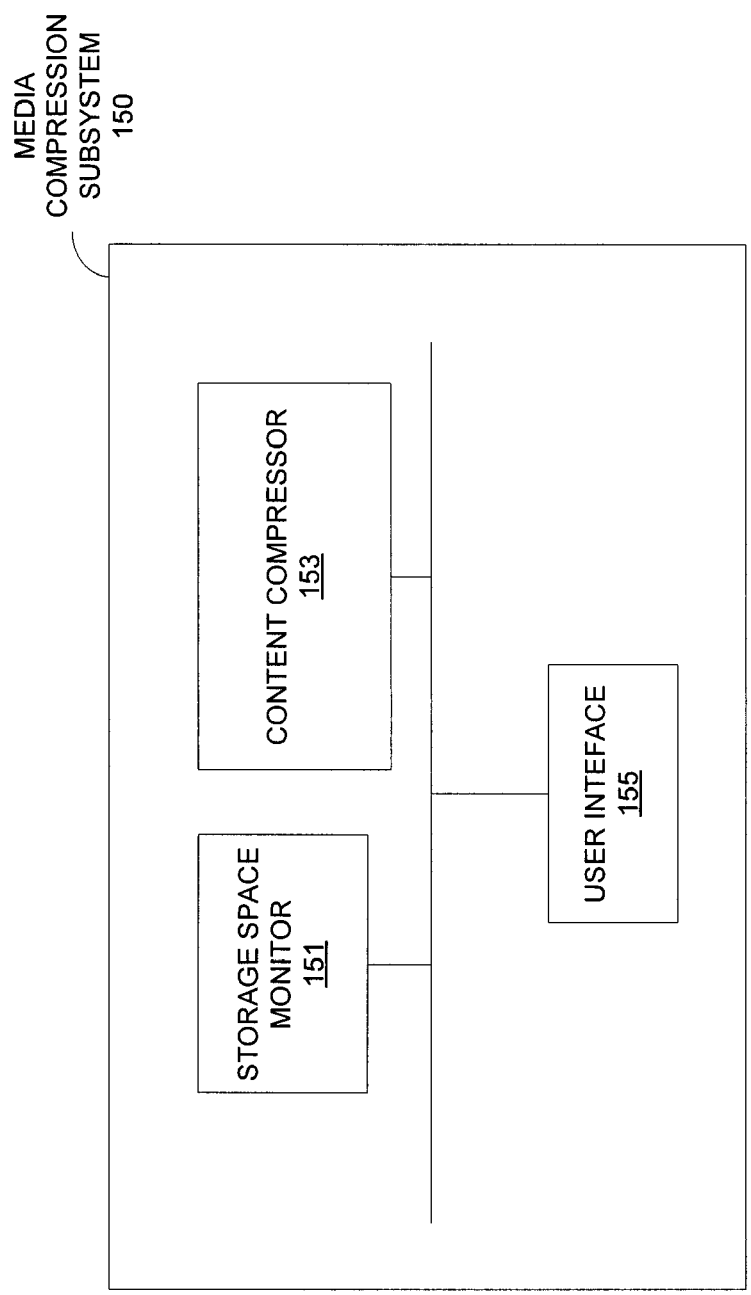
FIG. 1B illustrates a block diagram of one embodiment of a media compression subsystem.
Figure 3A:
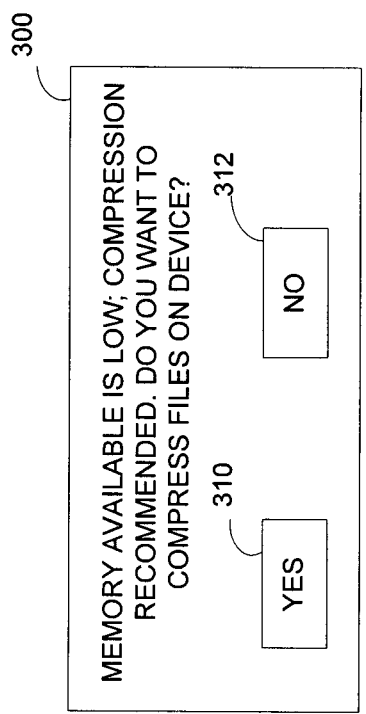
FIGS. 3A and 3B illustrate some embodiments of graphical user interface (GUI) usable with some embodiments of the present invention.
Figure 3B:
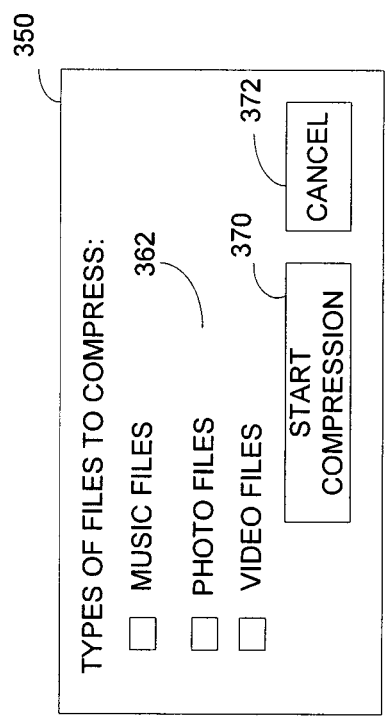

FIG. 1B illustrates a block diagram of one embodiment of a media compression subsystem in a digital device. The media compression subsystem 150 may include a storage space monitor 151, a content compressor 153, and a user interface 155. In some embodiments, the storage space monitor 151 monitors storage space available in the digital device. When the storage space available drops below a predetermined threshold, then the storage space monitor 151 may send a signal or a notice to cause the user interface 155 to generate a message to notify a user of the digital device that the storage space available is running low in the digital device. The user interface 155 may further display a question to ask if the user allows content stored in the digital device to be compressed. Some exemplary embodiments of user interface 155 are illustrated in FIGS. 3A-3B.

If the user allows content stored in the digital device to be compressed, then the content compressor 153 can perform lossy compression on the content stored in order to free up some storage space to increase the available storage space in the digital device. Otherwise, if the user does not allow compression of content, then nothing will be done.

Figure 2:
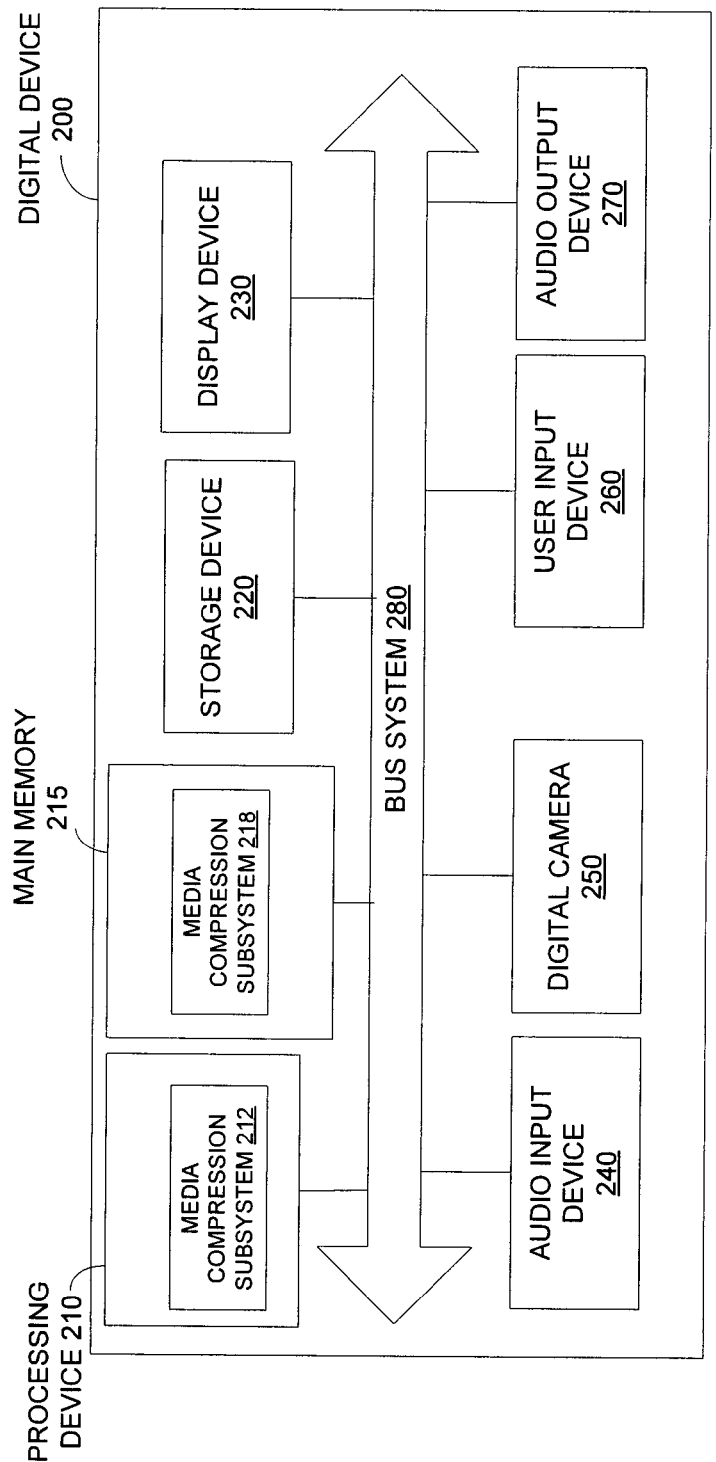
FIG. 2 illustrates one embodiment of a digital device usable with some embodiments of the present invention.

FIG. 2 illustrates one embodiment of a digital device usable with some embodiments of the present invention. The digital device may be implemented on a personal computer (PC), a laptop computer, a tablet computer, a smart phone, a cellular phone, a digital camera, a digital video camcorder, a media player (e.g., a digital video recorder, a MP3 player, etc.), a PDA, a multi-functional device or a multi-purpose device (e.g., a cellular phone with an integrated digital camera), etc. The digital device 200 in FIG. 2 includes a processing device 210, a main memory 215, a storage device 220, a display device 230, an audio input device 240, a digital camera 250, a user input device 260, an audio output device 270, coupled to each other via a bus system 280.

In some embodiments, the processing device 210 includes one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. A media compression subsystem 212, such as the one illustrated in FIG. 1B, can reside in the processing device 210.

The main memory 215 can include one or more computer readable storage media (a.k.a. machine readable storage media). The machine-readable storage medium may include one or more of a read-only memory (ROM), a flash memory, a dynamic random access memory (DRAM), a static random access memory (SRAM), etc. A media compression subsystem 218, such as the one illustrated in FIG. 1B, can reside in the main memory 215.

The storage device 220 can include one or more computer readable storage media. The storage device 220 may be installed within a housing of the digital device 200, and users of the digital device 200 in general cannot remove the storage device 220 from the digital device 200. For instance, the storage device 220 may include a hard drive installed within a housing of the digital device 200 (e.g., a laptop computer). Alternatively, the storage device 220 may be removably coupled to the digital device 200 such that users of the digital device 200 may readily remove the storage device 220 from the digital device 200. For instance, the storage device 220 may include a flash memory card, which can be readily removed by a user of the digital device (e.g., a digital camera). In general, the storage device 220 stores one or more types of content, such as still image files, music files, video files, etc. The storage device 220 may store other data (such as a configuration file of the digital device) and/or instructions executable by the processing device 210 as well.

In some embodiments, the processing device 210 may monitor the storage space available in the storage device 220. When the storage space available in the storage device 220 falls below a predetermined threshold, the processing device 210 may automatically generate a user interface to prompt the user of the digital device 200 to determine if the user allows compression of content stored in the storage device 220. If the user allows compression of content stored in the storage device 220, then the processing device 210 may perform lossy compression on the content in order to reduce the size of the content. As a result, the storage space available can be increased after the processing device 210 has performed lossy compression on the content. Details of some embodiments of a method to automatically compress content in a digital device have been discussed above.

In addition to the processing device 210 and the storage device 220, the digital device 200 may include a display device 230 (e.g., a liquid crystal display (LCD), a touch screen, a cathode ray tube (CRT), etc.), an audio input device 240 (e.g., a microphone), a digital camera 250, a user input device 260 (e.g., a keyboard, one or more buttons, a touch screen, etc.), and an audio output device (e.g., a speaker).

FIGS. 3A and 3B illustrate some embodiments of graphical user interface (GUI) usable with some embodiments of the present invention. Referring to FIG. 3A, one embodiment of a GUI 300 displays a message to inform a user of a digital device that available memory space in the digital device is running low, and compression of content stored on the digital device is recommended. The GUI 300 further displays a question to the user, asking whether the user wants to compress files on the digital device. In response, the user may actuate one of the "YES" button 310 and the "NO" button 312 to answer the question. If the user actuates the "NO" button 312, then the digital device will not compress the content stored on the digital device. Otherwise, if the user actuates the "YES" button 310, then the digital device may perform lossy compression on at least some of the content stored on the digital device.

In some embodiments, the digital device may further ask the user which type(s) of content on which the user allows compression. The digital device may display a GUI 350 as shown in FIG. 3B. The GUI 350 displays a list of different types of content 362, such as music files, photo files, and video files, from which the user may select. The user may select all of them or a subset of them to be compressed. Then the user may actuate the "START COMPRESSION" button 370 to initiate compression of the selected types of content. The GUI 350 also provides a "CANCEL" button 372 to allow the user to cancel compression of the content in case the user changes his/her mind.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "enabling" or "disabling" or "retracting" or "tracking" or "recording" or "iterating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of a method and an apparatus to lazily enable truth maintenance in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   monitoring available data storage space in a digital device;
   in response to the available data storage space falling below a threshold, receiving, by a processing device, an indication from a user of the digital device to allow compression of a content stored on the digital device;
   providing, by the processing device, to the user of the digital device, a type of the content to select for the compression; and
   upon receipt of the user selection of the type of the content to be compressed, performing, by the processing device, the compression on the selected type of content when the user allows compression.

2. The method of claim 1, further comprising:
   receiving user input from the user on whether the user allows compression of the type of content; and
   when the user allows compression, performing lossy compression on the type of content stored on the digital device.

3. The method of claim 1, further comprising:
   when the user allows compression, beginning to perform lossy compression on the type of content stored on the digital device; and
   terminating performance of the lossy compression on the type of content when the available data storage space becomes greater than the threshold.

4. The method of claim 1, wherein the type of content comprises one of a video data, audio data or image data.

5. The method of claim 1, further comprising allowing the user to modify the threshold.

6. The method of claim 1 further comprising terminating the compression on the type of content when the available data storage space becomes greater than the threshold.

7. The method of claim 1, further comprising:
   allowing the user to configure the threshold.

8. The method of claim 1, wherein the digital device comprises a digital camera.

9. An apparatus comprising:
   a memory; and
   a processing device, operatively coupled to the memory to:
      monitor available data storage space in a digital device,
      receive an indication from a user of the digital device to allow compression of a content stored in the digital device in response to the available data storage space falling below a threshold;
      provide to the user of the digital device, a type of the content to select for the compression;
      upon receipt of the user selection of the type of the content to be compressed, perform the compression on the selected type of content stored on the digital device when the user allows compression.

10. The apparatus of claim 9, the processing device to:
    receive user input from the user on whether the user allows compression of the type of content.

11. The apparatus of claim 9, the processing device to:
    perform lossy compression on the type of content when the user allows compression.

12. The apparatus of claim 9, wherein the type of content comprises one of a video data, audio data or image data.

13. The apparatus of claim 9, the processing device to:
allow the user to modify the threshold.

14. The apparatus of claim 9, wherein the processing device is to terminate the compression on the type of content when the available data storage space becomes greater than the threshold.

15. The apparatus of claim 9, the processing device to:
allow the user to configure the threshold.

16. The apparatus of claim 9, the processing device to:
capture still images to be stored on the digital device in a first format and convert the still images into a second format in response to the user allowing compression of the type of content.

17. A non-transitory computer-readable storage medium embodying instructions that, when executed by a processing device, will cause the processing device to:
monitor available data storage space in a digital device;
in response to the available data storage space falling below a threshold, receive, by the processing device, an indication from a user of the digital device to allow compression of a content stored on the digital device;
provide, by the processing device, to the user of the digital device, a type of the content to select for the compression;
upon receipt of the user selection of the type of the content to be compressed, perform, by the processing device, the compression on the selected type of content when the user allows compression.

18. The non-transitory computer-readable storage medium of claim 17, wherein the processing device is further to:
receive user input from the user on whether the user allows compression of the type of content; and
when the user allows compression, perform lossy compression on the type of content stored on the digital device.

19. The non-transitory computer-readable storage medium of claim 17, wherein the processing device is further to:
when the user allows compression, begin to perform lossy compression on the type of content stored on the digital device; and
terminate performance of the lossy compression on the type of content when the available data storage space becomes greater than the threshold.

20. The non-transitory computer-readable storage medium of claim 17, wherein the type of content comprises one of a video data, audio data or image data.

21. The non-transitory computer-readable storage medium of claim 17, the processing device is further to:
allow the user to modify the threshold.

22. The non-transitory computer-readable storage medium of claim 17, wherein the processing device is to terminate the compression on the type of content when the available data storage space becomes greater than the threshold.

23. The non-transitory computer-readable storage medium of claim 17, wherein the processing device is further to:
allow the user to configure the threshold.

24. The non-transitory computer-readable storage medium of claim 17, wherein the digital device comprises a digital camera.

* * * * *